US011976505B2

(12) United States Patent
Taylor et al.

(10) Patent No.: US 11,976,505 B2
(45) **Date of Patent: *May 7, 2024**

(54) DOOR SECURITY APPARATUS

(71) Applicants: Joseph Curtis Taylor, Birch Run, MI (US); Jack Roy Taylor, Clio, MI (US)

(72) Inventors: Joseph Curtis Taylor, Birch Run, MI (US); Jack Roy Taylor, Clio, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,360

(22) Filed: Jan. 23, 2023

(65) Prior Publication Data

US 2023/0203861 A1 Jun. 29, 2023

Related U.S. Application Data

(63) Continuation of application No. 16/935,944, filed on Jul. 22, 2020, now Pat. No. 11,560,742.

(60) Provisional application No. 62/877,514, filed on Jul. 23, 2019.

(51) Int. Cl.

| | |
|---|---|
| ***G08B 21/00*** | (2006.01) |
| ***E05B 9/02*** | (2006.01) |
| ***E05B 45/06*** | (2006.01) |
| ***E05C 19/00*** | (2006.01) |
| ***G08B 3/10*** | (2006.01) |

(52) U.S. Cl.

CPC .............. *E05C 19/003* (2013.01); *E05B 9/02* (2013.01); *E05B 45/06* (2013.01); *G08B 3/10* (2013.01); *E05B 2045/064* (2013.01); *E05B 2045/0665* (2013.01); *E05Y 2900/132* (2013.01)

(58) Field of Classification Search

CPC ........ E05C 19/003; E05C 19/184; E05B 9/02; E05B 45/06; E05B 2045/064; E05B 2045/0665; E05B 2045/063; E05B 2047/0068; G08B 3/10; E05Y 2900/132

USPC .......................................................... 292/289

See application file for complete search history.

(56) References Cited

U.S. PATENT DOCUMENTS

| | | | |
|---|---|---|---|
| 51,803 | A | 1/1866 | Childs |
| 1,544,268 | A | 6/1925 | Murray |
| 1,571,543 | A | 2/1926 | Fratzke |
| 2,205,614 | A | 6/1940 | Bashe |

(Continued)

FOREIGN PATENT DOCUMENTS

| | | | |
|---|---|---|---|
| AU | 2011256239 | B2 | 1/2015 |
| CN | 203905678 | U | 10/2014 |

(Continued)

OTHER PUBLICATIONS

Fire Door Solutions LLC, "DoorArmor by Fire Door Solutions: Protecting Schools From Active Shooters." Retrieved from https://firedoorarmor.com/downloads/fire-door-armor.pdf.

(Continued)

*Primary Examiner* — Mark S Rushing

(74) *Attorney, Agent, or Firm* — Harness, Dickey & Pierce, P.L.C.

(57) ABSTRACT

A door security apparatus includes a door-locking member and a sensor assembly. The door-locking member removably engages a plate. The door-locking member is a barricade that restricts movement of a door from a closed position to an open position while the door-locking member is engaged with the plate The sensor assembly is configured to detect engagement between the door-locking member and the plate.

27 Claims, 9 Drawing Sheets

(56) References Cited

U.S. PATENT DOCUMENTS

| | | | |
|---|---|---|---|
| 2,264,962 | A | 12/1941 | Adams |
| 3,378,293 | A | 4/1968 | Silk |
| 3,661,413 | A | 5/1972 | Silva |
| 3,768,847 | A | 10/1973 | Buck, Jr. et al. |
| 3,833,963 | A | 9/1974 | Waters |
| 3,973,420 | A | 8/1976 | Brady et al. |
| 4,017,105 | A | 4/1977 | Paxton |
| 4,139,249 | A | 2/1979 | Hillman |
| 4,163,574 | A | 8/1979 | Chezem |
| 4,208,841 | A | 6/1980 | Starks |
| 4,270,668 | A | 6/1981 | Berfield |
| 4,274,666 | A | 6/1981 | Peck |
| 4,303,265 | A | 12/1981 | Beard |
| 4,579,377 | A | 4/1986 | Dallaire et al. |
| 4,714,284 | A | 12/1987 | Varlet |
| 4,759,575 | A | 7/1988 | McKnight |
| 4,792,168 | A | 12/1988 | Kardosh |
| 4,822,084 | A | 4/1989 | Fox |
| 4,907,832 | A | 3/1990 | Pemberton |
| 4,932,694 | A | 6/1990 | Cater, Sr. |
| 4,955,648 | A | 9/1990 | Miller |
| 5,040,835 | A | 8/1991 | Barker |
| 5,199,759 | A | 4/1993 | Anderson |
| 5,203,596 | A | 4/1993 | Stevens |
| 5,209,018 | A | 5/1993 | Heinrich |
| 5,226,201 | A | 7/1993 | Lefebvre |
| 5,292,013 | A | 3/1994 | Earl |
| 5,383,254 | A | 1/1995 | Wigley, Sr. |
| 5,445,451 | A | 8/1995 | Harmony |
| 5,454,143 | A | 10/1995 | Wigley, Sr. |
| 5,454,610 | A | 10/1995 | Taylor et al. |
| 5,531,490 | A | 7/1996 | Parker |
| 5,549,338 | A | 8/1996 | Wingfield et al. |
| 5,590,918 | A | 1/1997 | Kambalov |
| 5,590,928 | A | 1/1997 | Voiculescu |
| 5,601,320 | A | 2/1997 | Miller |
| 5,645,304 | A | 7/1997 | Richardson et al. |
| D384,875 | S | 10/1997 | Sayler et al. |
| 5,771,533 | A | 6/1998 | Kuang-Pin |
| 5,865,484 | A | 2/1999 | Johns |
| 5,904,325 | A | 5/1999 | Hung |
| D419,052 | S | 1/2000 | Aporte et al. |
| 6,082,431 | A | 7/2000 | Decola |
| 6,167,655 | B1 | 1/2001 | Santa Cruz et al. |
| 6,340,185 | B1 | 1/2002 | Truong |
| 6,352,290 | B1 | 3/2002 | Scottino |
| 6,382,689 | B1 | 5/2002 | Brown |
| 6,397,645 | B1 | 6/2002 | Grant, Jr. |
| 6,471,264 | B1 | 10/2002 | Ryan |
| 6,484,445 | B2 | 11/2002 | Chang |
| 6,550,828 | B2 | 4/2003 | Warden |
| 6,655,720 | B2 | 12/2003 | Rampen |
| 6,666,486 | B1 | 12/2003 | Fleming |
| 6,832,251 | B1 | 12/2004 | Gelvin et al. |
| 7,005,984 | B2 | 2/2006 | Maloney |
| 7,651,140 | B2 | 1/2010 | Leggio |
| D612,717 | S | 3/2010 | Frankel |
| 7,731,252 | B1 | 6/2010 | Stewart |
| 7,961,088 | B2 | 6/2011 | Watts et al. |
| 8,096,593 | B2 | 1/2012 | Gibbons |
| 8,510,994 | B2 | 8/2013 | Scott |
| 8,754,769 | B2 | 6/2014 | Stein et al. |
| 8,888,146 | B2 | 11/2014 | Taylor et al. |
| 8,894,110 | B2 | 11/2014 | Taylor et al. |
| 8,963,713 | B2 | 2/2015 | Dawes et al. |
| D728,264 | S | 5/2015 | Bacolas |
| 9,482,034 | B2 | 11/2016 | Atkinson, Jr. |
| 9,534,430 | B2 | 1/2017 | Taylor et al. |
| 9,704,000 | B2 | 7/2017 | Pleshek et al. |
| 9,957,741 | B2 | 5/2018 | Taylor et al. |
| D860,682 | S | 9/2019 | Gaetano |
| 10,592,861 | B2 | 3/2020 | Kemp |
| 10,689,890 | B2 | 6/2020 | Taylor et al. |
| 2002/0067046 | A1 | 6/2002 | Cox |
| 2007/0090921 | A1 | 4/2007 | Fisher |
| 2009/0127870 | A1 | 5/2009 | Leggio |
| 2009/0153291 | A1* | 6/2009 | Larson ............... G07C 9/00817 340/5.33 |
| 2011/0011137 | A1 | 1/2011 | Frankel |
| 2011/0291426 | A1 | 12/2011 | Gibson |
| 2013/0193695 | A1 | 8/2013 | Taylor et al. |
| 2014/0217754 | A1 | 8/2014 | Taylor et al. |
| 2014/0352899 | A1 | 12/2014 | Moolenbeek |
| 2015/0048631 | A1 | 2/2015 | Ploskunak |
| 2015/0076844 | A1 | 3/2015 | Taylor et al. |
| 2016/0010372 | A1 | 1/2016 | Taylor et al. |
| 2016/0284178 | A1* | 9/2016 | Cushwa, Jr. ........... G08B 13/08 |
| 2017/0145721 | A1 | 5/2017 | Taylor et al. |
| 2017/0228954 | A1 | 8/2017 | Evans et al. |
| 2019/0003221 | A1 | 1/2019 | Taylor et al. |
| 2019/0130723 | A1* | 5/2019 | Thiel ....................... E05B 41/00 |
| 2020/0318405 | A1 | 10/2020 | Taylor et al. |
| 2021/0025205 | A1 | 1/2021 | Taylor et al. |

FOREIGN PATENT DOCUMENTS

| | | | |
|---|---|---|---|
| DE | 1036482 | B | 8/1958 |
| DE | 202016001589 | U1 | 6/2016 |
| WO | 2006015239 | A2 | 2/2006 |

OTHER PUBLICATIONS

Taylor Brothers Door Lock, LLC, "Nightlock® Lockdown 1." Retrieved from https://nightlock.com/door-security-devices/door-barricade/nightlock-lockdown/.

Office Action regarding U.S. Appl. No. 13/363,106, dated Nov. 20, 2013.

Office Action regarding U.S. Appl. No. 13/363,106, dated Mar. 13, 2014.

Office Action regarding U.S. Appl. No. 14/172,485, dated Mar. 25, 2014.

Office Action regarding U.S. Appl. No. 14/551,829, dated Jan. 16, 2015.

Office Action regarding U.S. Appl. No. 14/800,189, dated Mar. 29, 2016.

Office Action regarding U.S. Appl. No. 15/394,099, dated Jun. 6, 2017.

Office Action regarding U.S. Appl. No. 15/394,099, dated Oct. 17, 2017.

International Search Report regarding International Application No. PCT/US2018/040248, dated Nov. 16, 2018.

Written Opinion of the International Searching Authority regarding International Application No. PCT/US2018/040248, dated Nov. 16, 2018.

Office Action regarding U.S. Appl. No. 15/668,133, dated Sep. 10, 2019.

Office Action regarding Chinese Patent Application No. 201880043598.9, dated Oct. 27, 2020. Translation provided by Unitalen Attorneys at Law.

Office Action regarding Canadian Patent Application No. 3,068,307, dated Feb. 9, 2021.

Search Report regarding European Patent Application No. 18823348.0, dated Mar. 5, 2021.

Office Action regarding U.S. Appl. No. 16/935,944, dated Jan. 18, 2022.

Office Action regarding U.S. Appl. No. 16/906,366, dated Dec. 27, 2021.

Notice of Allowance regarding U.S. Appl. No. 16/906,366 dated Jun. 17, 2022.

Final Office Action regarding U.S. Appl. No. 17/197,810 dated Aug. 23, 2022.

Notice of Allowance regarding U.S. Appl. No. 17/197,810 dated Dec. 9, 2022.

* cited by examiner

DOOR SECURITY APPARATUS

CROSS-REFERENCE TO RELATED APPLICATIONS

This application is a continuation of U.S. patent application Ser. No. 16/935,944 filed on Jul. 22, 2020, which claims the benefit of U.S. Provisional Application No. 62/877,514, filed on Jul. 23, 2019. The entire disclosures of the above applications are incorporated herein by reference.

FIELD

The present disclosure relates to a door security apparatus.

BACKGROUND

This section provides background information related to the present disclosure and is not necessarily prior art.

A door-locking member or handle may engage a door to restrict entry into a building and/or into a room within a building during emergency situations, such as a school lockdown for example. The present disclosure provides a storage unit that houses the door-locking member near the door such that persons can easily access the door-locking member in the event of an emergency situation. Furthermore, the present disclosure provides a notification system that notifies the proper authorities when the storage unit is opened and/or when the door-locking member is removed from the storage unit.

SUMMARY

This section provides a general summary of the disclosure, and is not a comprehensive disclosure of its full scope or all of its features.

In one form, the present disclosure provides a door security apparatus that includes a storage container, a door-locking member and a sensor assembly. The door-locking member is removably disposed within the storage container. The sensor assembly is associated with the door-locking member and configured to detect removal of the door-locking member from the storage container.

In some configurations of the door security apparatus of the above paragraph, the sensor assembly includes a sensor that is attached to the door-locking member.

In some configurations of the door security apparatus of any one or more of the above paragraphs, the sensor includes an accelerometer. The sensor is configured to detect removal of the door-locking member from the storage container by a change in acceleration of the door-locking member as it is being removed from the storage container.

In some configurations of the door security apparatus of any one or more of the above paragraphs, a control module is in communication with the sensor. The sensor is configured to send a signal to the control module upon detecting removal of the door-locking member from the storage container.

In some configurations of the door security apparatus of any one or more of the above paragraphs, a notification system is in communication with the control module. The notification system is configured to generate an alert indicating that the door-locking member has been removed from the storage container when the sensor sends the signal to the control module.

In some configurations of the door security apparatus of any one or more of the above paragraphs, the notification system is a smartphone or a tablet.

In some configurations of the door security apparatus of any one or more of the above paragraphs, the sensor assembly includes a magnet that is associated with the storage container and configured to communicate with the sensor to detect removal of the door-locking member from the storage container.

In some configurations of the door security apparatus of any one or more of the above paragraphs, a control module is in communication with the sensor. The sensor is configured to send a signal to the control module upon detecting removal of the door-locking member from the storage container.

In some configurations of the door security apparatus of any one or more of the above paragraphs, a notification system is in communication with the control module. The notification system is configured to generate an alert indicating that the door-locking member has been removed from the storage container when the sensor sends the signal to the control module.

In another form, the present disclosure provides a door security apparatus that includes a storage container and a sensor assembly. The storage container operable to house a door-locking member and includes a second member and a first member. The second member is rotatably attached to the first member between a closed position and an open position. The sensor assembly is associated with the second member. The sensor assembly is configured to detect rotation of the second member from the closed position to the open position.

In some configurations of the door security apparatus of the above paragraph, the sensor assembly includes a sensor that is attached to the second member.

In some configurations of the door security apparatus of any one or more of the above paragraphs, the sensor includes an accelerometer. The sensor is configured to detect rotation of the second member from the closed position to the open position by a change in acceleration of the second member as it is rotated from the closed position to the open position.

In some configurations of the door security apparatus of any one or more of the above paragraphs, a control module is in communication with the sensor. The sensor is configured to send a signal to the control module upon detecting rotation of the second member from the closed position to the open position.

In some configurations of the door security apparatus of any one or more of the above paragraphs, a notification system is in communication with the control module. The notification system is configured to generate an alert indicating that the second member has been opened when the sensor sends the signal to the control module.

In some configurations of the door security apparatus of any one or more of the above paragraphs, the notification system is a smartphone or a tablet.

In some configurations of the door security apparatus of any one or more of the above paragraphs, the sensor assembly includes a magnet that is associated with the first member and configured to communicate with the sensor to detect rotation of the second member from the closed position to the open position.

In some configurations of the door security apparatus of any one or more of the above paragraphs, a control module is in communication with the sensor. The sensor is configured to send a signal to the control module upon detecting rotation of the second member from the closed position to the open position.

In some configurations of the door security apparatus of any one or more of the above paragraphs, a notification system is in communication with the control module. The notification system is configured to generate an alert indicating that the second member has been opened when the sensor sends the signal to the control module.

In some configurations of the door security apparatus of any one or more of the above paragraphs, a first plate is attached to a floor of a room and a second plate is attached to a door of the room. The door-locking member is configured to be attached to the first and second plates to prevent the door from moving from a closed position to an open position.

In some configurations of the door security apparatus of any one or more of the above paragraphs, a second sensor assembly includes a sensor associated with the door-locking member and a magnet associated with one of the first and second plates. The sensor and the magnet communicate with each other to detect attachment of the door-locking member to the first and second plates.

In some configurations of the door security apparatus of any one or more of the above paragraphs, a control module that is in communication with the sensor. The sensor is configured to send a signal to the control module upon detecting attachment of the door-locking member to the first and second plates.

In some configurations of the door security apparatus of any one or more of the above paragraphs, a notification system is in communication with the control module. The notification system is configured to generate an alert indicating that the door-locking member has been attached to the first and second plates.

In yet another form, the present disclosure provides a door security apparatus that includes a storage container, a sensor assembly and a control module. The storage container houses a door-locking member and includes a second member and a first member. The second member is rotatably attached to the first member between a closed position and an open position. The sensor assembly is associated with at least one of the second member and the first member. The sensor assembly is configured to detect rotation of the second member from the closed position to the open position. The control module is in communication with the sensor assembly and configured to receive a signal from the sensor assembly when the sensor assembly detects rotation of the second member from the closed position to the open position. The control module is configured to generate an audible alarm upon receipt of the signal from the sensor assembly.

In some configurations of the door security apparatus of the above paragraph, a notification system that is in communication with the control module. The notification system is configured to generate an alert indicating that the second member has been opened when control module receives a signal from the sensor assembly.

In some configurations of the door security apparatus of any one or more of the above paragraphs, the notification system is a smartphone or a tablet.

In some configurations of the door security apparatus of any one or more of the above paragraphs, the sensor assembly includes a sensor attached to the second member and a magnet attached to the first member. The sensor and the magnet are configured to communicate with each other to detect rotation of the second member from the closed position to the open position.

In yet another form, the present disclosure provides a door security apparatus having a storage container that includes a first member and a second member. The first member defines a slot that receives a door-locking member. The second member is rotatably attached to the first member between a closed position and an open position. The second member and the first member cooperate to define a cavity that houses the door-locking member when the second member is in the closed position.

In some configurations of the door security apparatus of the above paragraph, the first member includes a mounting plate and a housing integrally formed to the mounting plate. The housing extends into the cavity when the second member is in the closed position.

In some configurations of the door security apparatus of any one or more of the above paragraphs, the housing defines the slot therein.

In some configurations of the door security apparatus of any one or more of the above paragraphs, the housing is integrally formed to the mounting plate at a periphery thereof.

In some configurations of the door security apparatus of any one or more of the above paragraphs, the slot is T-shaped.

In some configurations of the door security apparatus of any one or more of the above paragraphs, the slot defines a base surface.

In some configurations of the door security apparatus of any one or more of the above paragraphs, the slot extends in a vertical direction between an upper surface of the housing and a lower surface of the housing.

In some configurations of the door security apparatus of any one or more of the above paragraphs, the slot extends in a horizontal direction between an outer surface of the housing and an inner surface of the housing.

In some configurations of the door security apparatus of any one or more of the above paragraphs, a portion of the second member is transparent.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
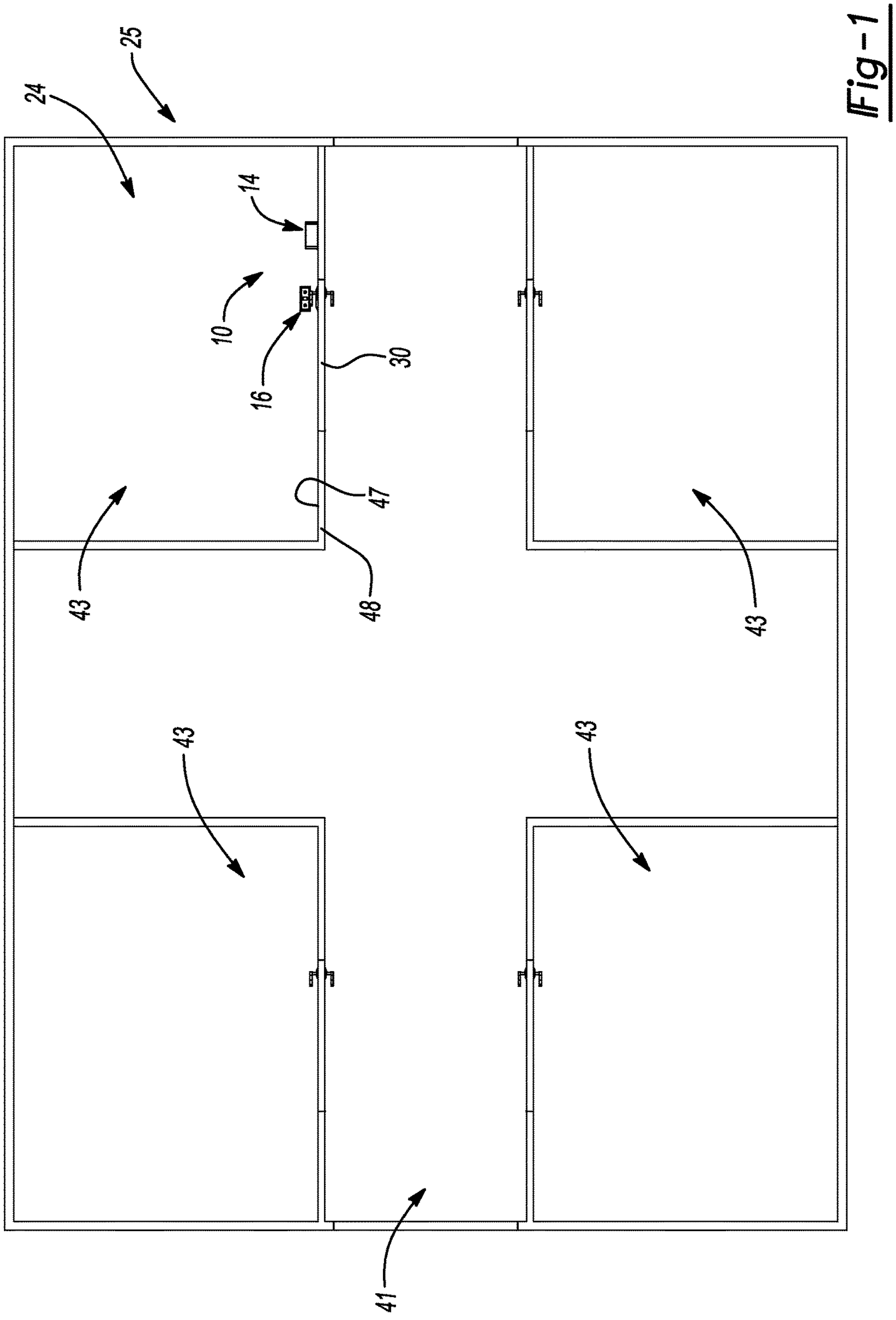
FIG. 1 is a schematic representation of a building having a door security apparatus according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
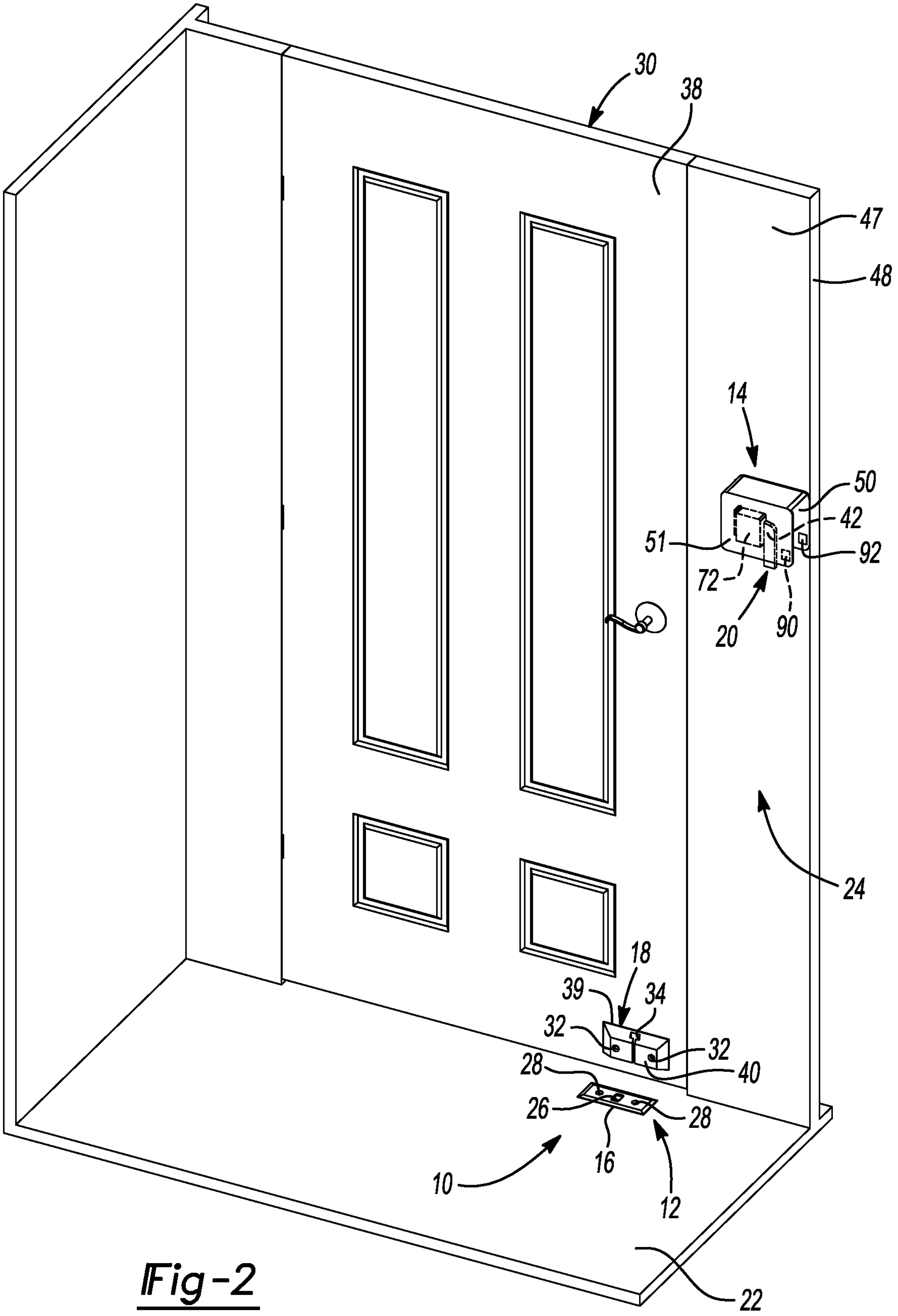
FIG. 2 is a partial perspective view of a room of the building showing a door-locking member of the door security apparatus installed within a storage container of the door security apparatus.
Figure 3:
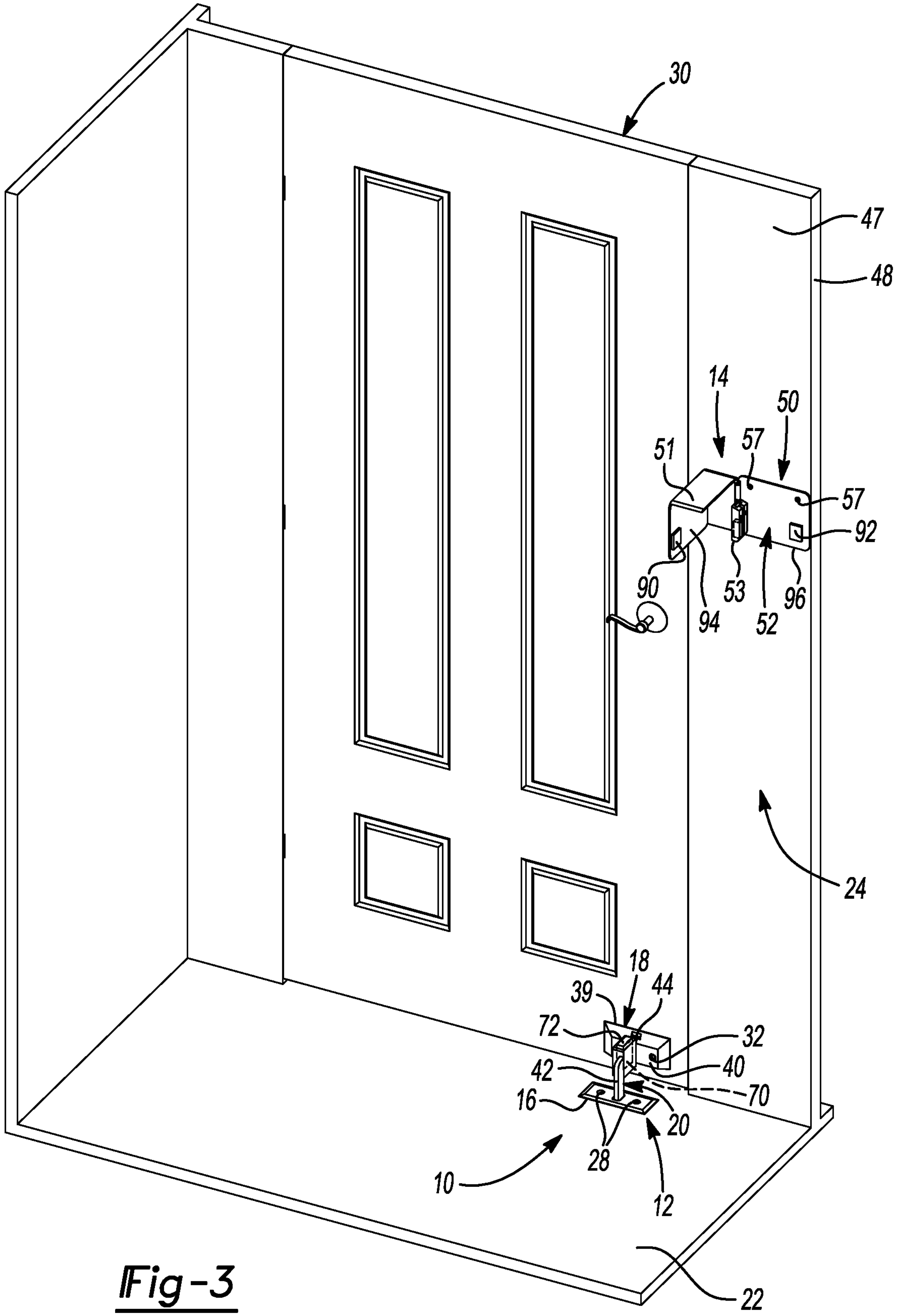
FIG. 3 is a partial perspective view of the room of the building showing the door-locking member attached to first and second plates of the door security apparatus.

With reference to FIGS. 1-3, a door security apparatus 10 is provided. The door security apparatus 10 may include a door security device 12 and a storage container 14. As shown in FIGS. 2 and 3, the door security device 12 may include a first plate 16, a second plate 18 and a handle or door-locking member 20. The first plate 16 may be disposed on a floor 22 of a room 24 of a building 25 (e.g., a floor of an enclosed room of a building), for example. The first plate 16 may include a first aperture 26 extending at least partially therethrough and second apertures 28 extending therethrough. The first aperture 26 may be disposed between the second apertures 28. Fasteners (not shown) may extend through the second apertures 28 to fixedly mount the first plate 16 to the floor 22.

The second plate 18 may be positioned near or at a lower edge of a door 30 that is rotatable between a closed position (FIGS. 2 and 3) and an open position (not shown). The second plate 18 may include apertures 32 extending therethrough and a slot 34. Fasteners (not shown) may extend through the apertures 32 of the second plate 18 to fixedly mount the second plate 18 to an inner surface 38 of the door 30 (i.e., the inner surface 38 of the door 30 being accessible by persons in the room 24 and inaccessible by persons outside the room 24 when the door 30 is in a closed position). The T-shaped slot 34 may be formed in the second plate 18 and between the apertures 32. The slot 34 may extend in a vertical direction between a pair of opposing horizontal edges 39 of the second plate 18 (only one of the opposing horizontal edges 39 is shown in FIGS. 2 and 3). The slot 34 may also extend in a horizontal direction between an outer surface 40 of the second plate 18 and a back surface (not shown) of the second plate 18 that is opposite the outer surface 40 (i.e., the back surface of the second plate 18 contacts the inner surface 38 of the door 30). In some configurations, the slot 34 may be rectangular-shaped or circular-shaped, for example.

The door-locking member 20 may be an L-shaped member made of a metallic material, for example, and may be movable between a locked position (FIG. 3) in which the door-locking member 20 is attached to the first and second plates 16, 18 to prevent the door 30 from being moved from the closed position to an open position, and an unlocked position (FIG. 2) in which the door-locking member 20 is detached from the first and second plates to allow the door 30 to move from the closed position to the open position. When the door-locking member 20 is in the locked position, persons, for example, in other areas of the building 25 (e.g., a hallway 41 or other rooms 43 of the building 25) are prevented from gaining access to the room 24. For example, the door-locking member 20 operates to oppose forces applied to the door 30 from outside the room 24, thereby preventing the door 30 from being moved from the closed position to the open position.

As shown in FIGS. 2-8, the door-locking member 20 may include a first leg 42 and a second leg 44. The first leg 42 may extend generally in a vertical direction and may have a shape that corresponds to the shape of the first aperture 26 of the first plate 16. The second leg 44 may be T-shaped and may extend perpendicular from the first leg 42 in a horizontal direction. The first leg 42 may have a thickness that is greater than a thickness of the second leg 44.

As shown in FIG. 3, when the door-locking member 20 is in the locked position, the first leg 42 may be received in the first aperture 26 formed in the first plate 16 and the second leg 44 may be received in the slot 34 formed in the second plate 18. In some configurations, the first aperture 26 formed in the first plate 16 may be aligned with a recess (not shown) formed in the floor 22 of the room 24. In such configuration, when the door-locking member 20 is in the locked position, the first leg 42 may be received in the first aperture 26 formed in the first plate 16 and the recess formed in the floor 22. In this way, the door 30 is further prevented from moving from the closed position to the open position (i.e., the door 30 is able to oppose greater forces applied thereto from outside the room 24).

As shown in FIG. 1-3, the storage container 14 may be attached to an inner surface 47 of a wall 48 of the room 24 adjacent to the door 30. The storage container 14 may house the door-locking member 20 when the door-locking member 20 is detached from the first and second plates 16, 18. In this way, the door-locking member 20 is easily accessible during an emergency situation (e.g., building lockdown). That is, in the event of an emergency situation, the door-locking member 20 may be removed from the storage container 14 and attached to the first and second plates 16, 18 as described above, thereby preventing the door 30 from being moved from the closed position to the open position.

Figure 4:
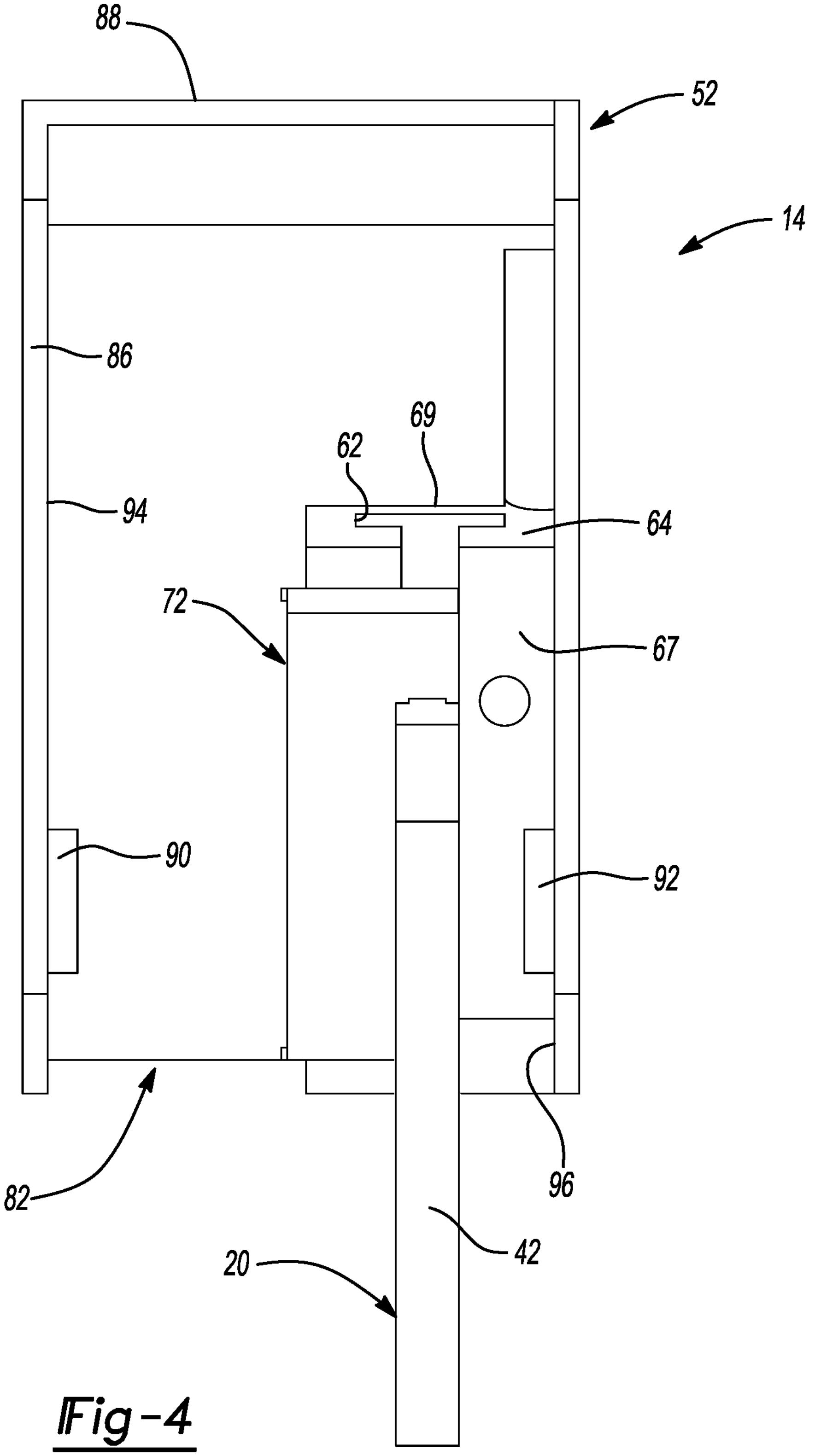
FIG. 4 is a perspective view of the storage container in a closed position and having the door-locking member installed therein.
Figure 5:
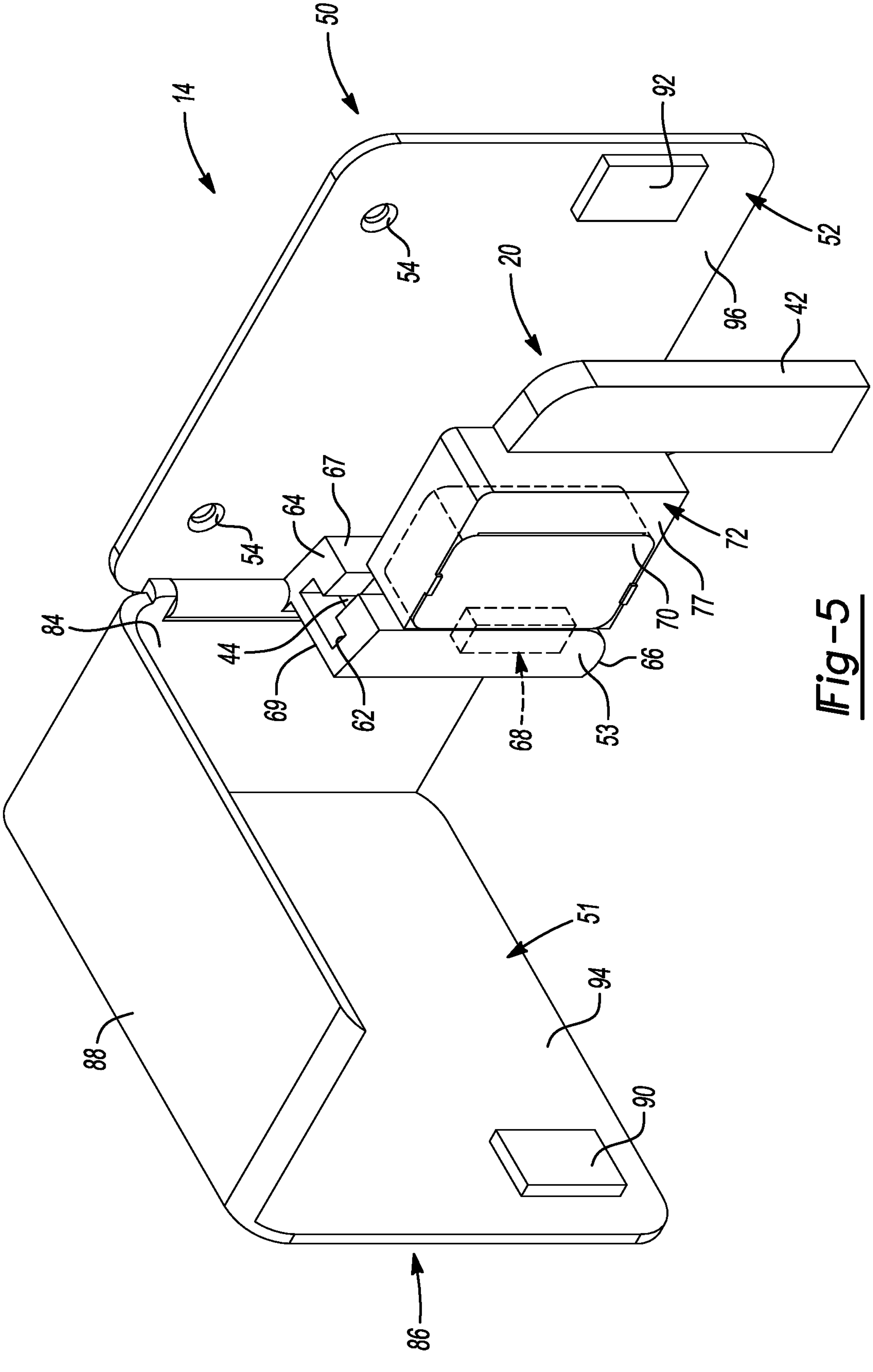
FIG. 5 is a perspective view of the storage container in an open position and having the door-locking member installed therein.
Figure 6:
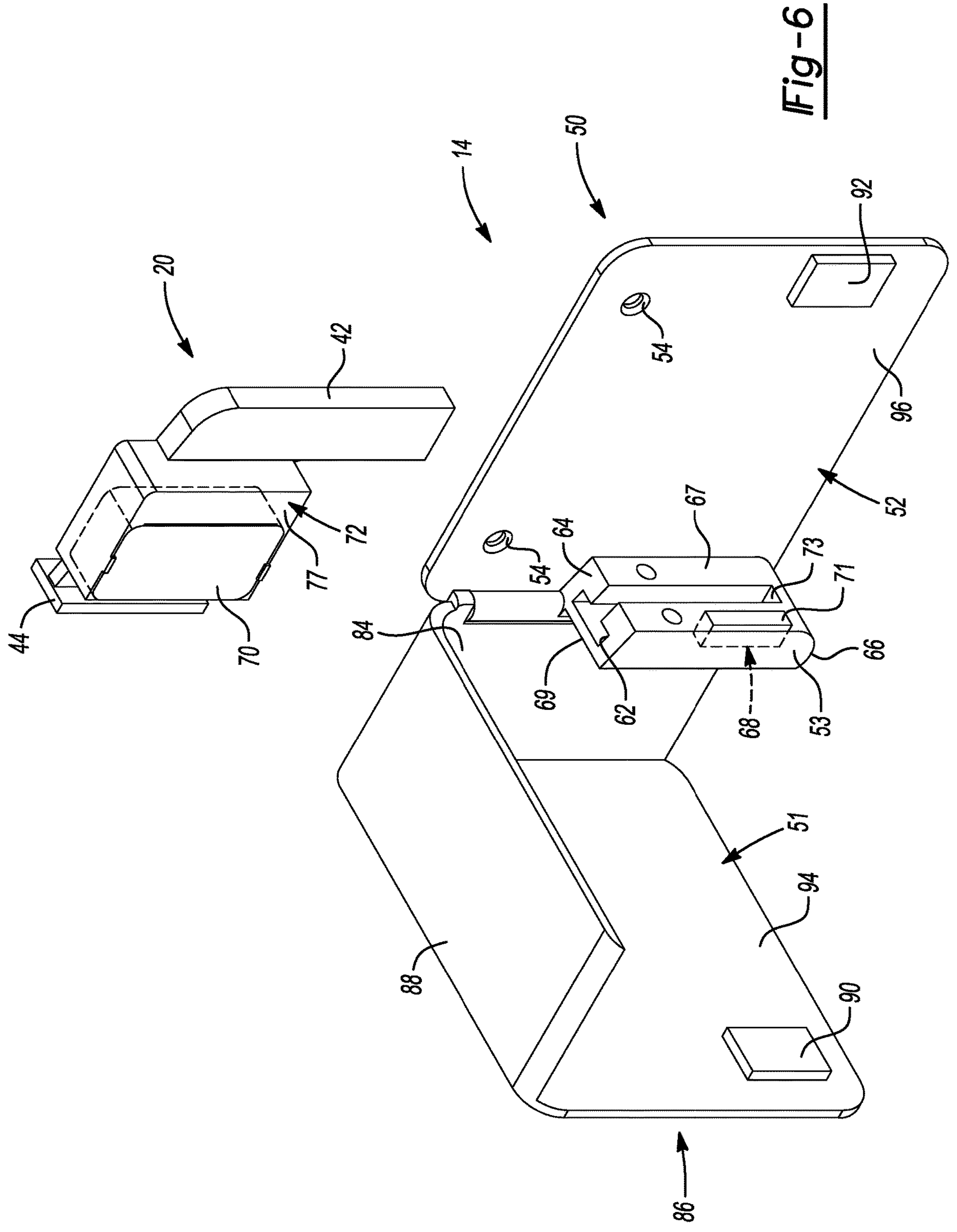
FIG. 6 is a perspective view of the storage container in the open position and having the door-locking member removed therefrom.
Figure 7:
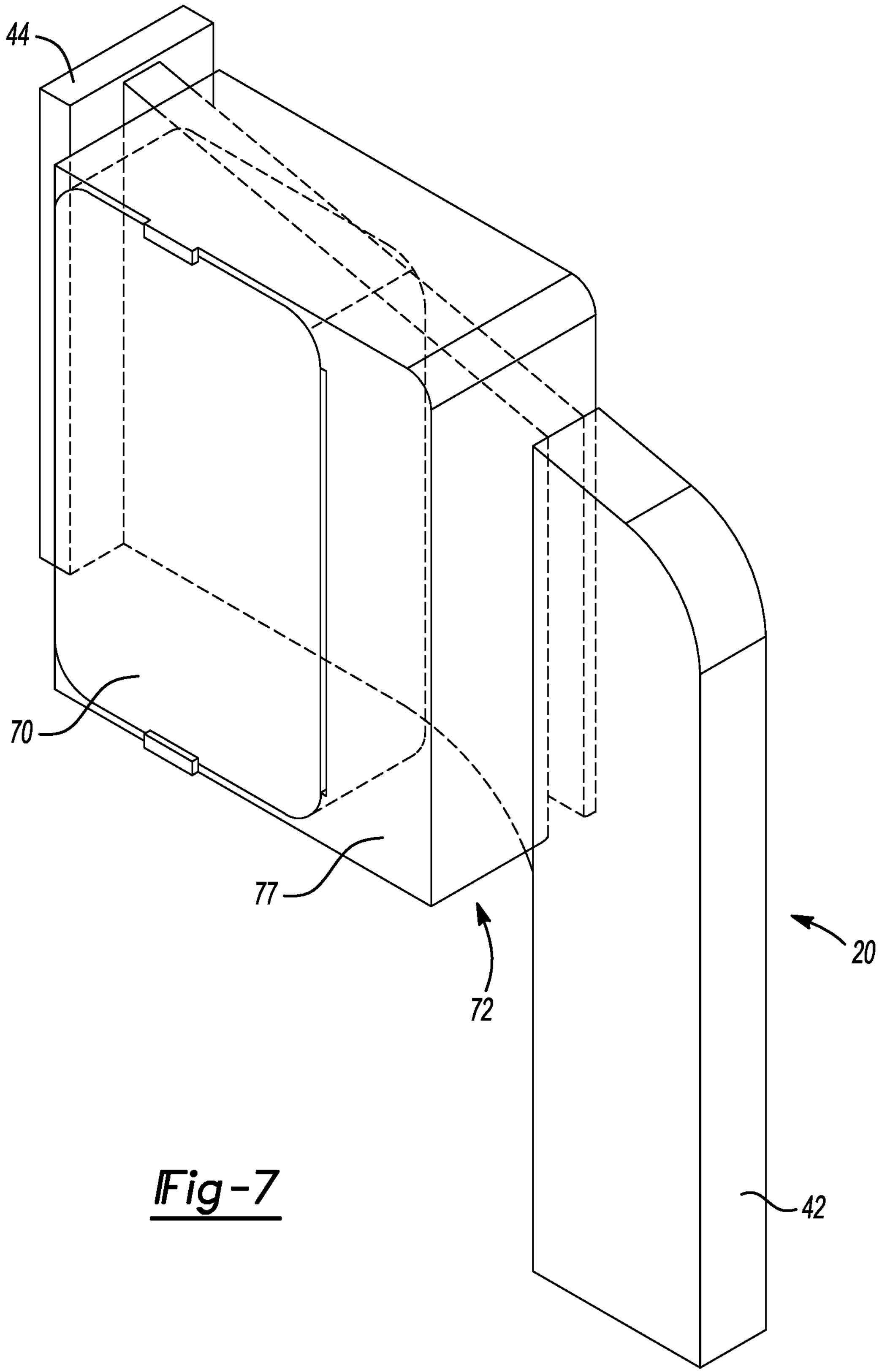
FIG. 7 is a perspective view of the door-locking member.
Figure 8:
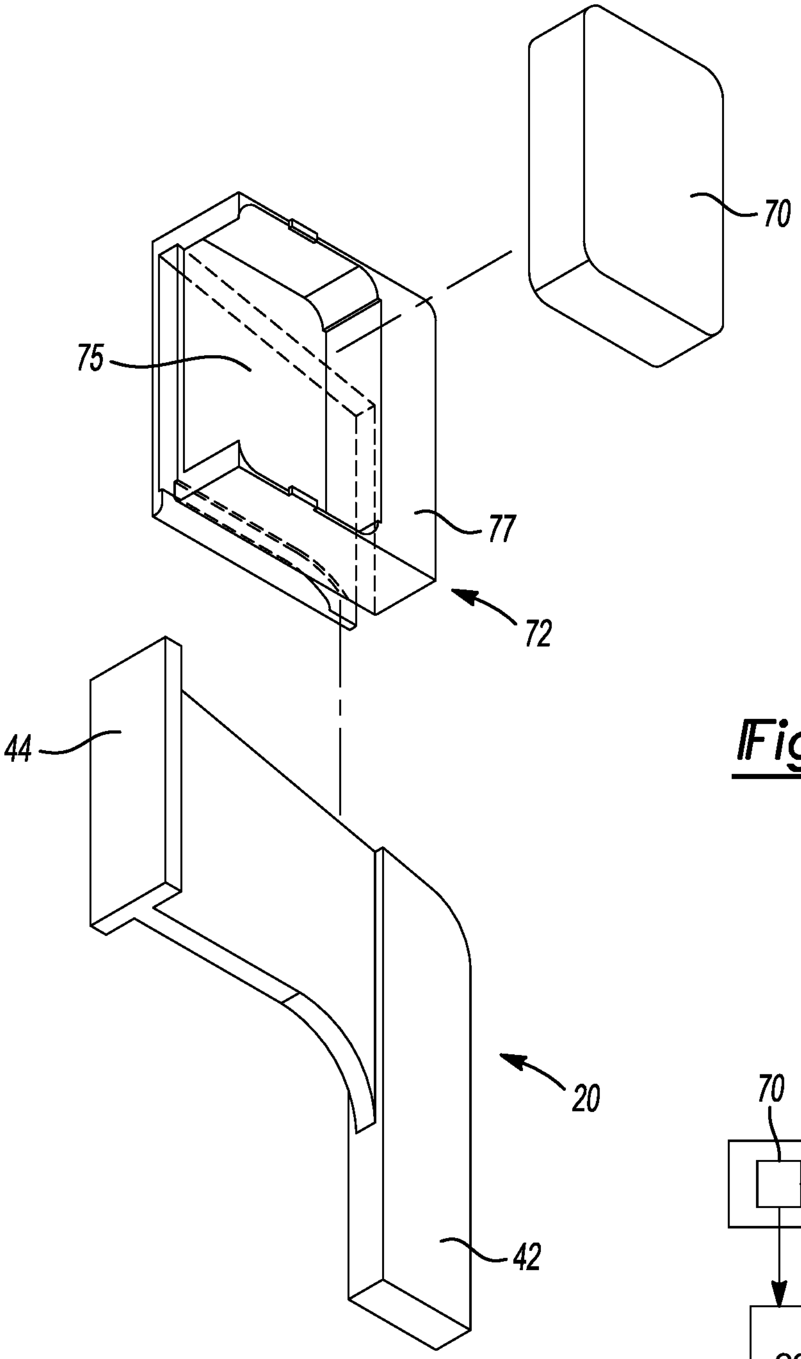
FIG. 8 is an exploded view of the door-locking member, a saddle and a sensor.

With reference to FIGS. 2-6, the storage container 14 may include a first member 50 and a second member 51 that may be hingedly connected to each other to allow relative movement between the first and second members between a closed position (FIG. 4) and an open position (FIG. 5). The first member 50 may include a mounting plate 52 and a housing 53. The mounting plate 52 may include a plurality of apertures 54 extending therethrough (FIGS. 5 and 6). Fasteners 57 (FIG. 3) may extend through the apertures 54 to fixedly mount the mounting plate 52 to the inner surface 47 of the wall 48. The housing 53 may be a protrusion integrally formed to an inner surface of the mounting plate 52 that is opposite an outer surface of the mounting plate 52 (the outer surface of the mounting plate 52 abuts against the inner surface 47 of the wall 48 once the mounting plate 52 is mounted to the wall 48). The housing 53 may also be integrally formed to the inner surface of the mounting plate 52 at or near a periphery thereof. In some configurations, the housing 53 may be integrally formed to the inner surface of the mounting plate 52 at a middle portion thereof.

A T-shaped slot 62 may be formed in the housing 53 and may extend in a vertical direction between an upper surface 64 of the housing 53 and a lower surface 66 of the housing 53. The slot 62 may also extend in a horizontal direction between an outer surface 67 of the housing 53 and an inner surface 69 of the housing 53 that is opposite the outer surface 67. In some configurations, the slot 62 may be rectangular-shaped or circular-shaped, for example. The shape of the second leg 44 may correspond to the shape of the slot 62 so that the second leg 44 may be securely received in the slot 62 (FIGS. 4 and 5) and the second leg 44 may rest on a base surface 73 that defines the slot 62 (FIG. 6). The first leg 42 may extend partially out of the storage container 14 once the second leg 44 is securely received in the slot 62 (FIGS. 2 and 4). This may help users (not shown) to readily identify that the door-locking member 20 is housed in the storage container 14.

A sensor assembly 65 may detect when the door-locking member 20 is removed from the slot 62. The sensor assembly 65 may include a magnet 68 and a sensor 70. The magnet 68 may be associated with the housing 53 and the sensor 70 may be associated with the door-locking member 20. For example, the magnet 68 may be embedded within the housing 53 so that a surface 71 of the magnet 68 is co-planar with the outer surface 67 of the housing 53. In some configurations, the magnet 68 may be disposed on the outer surface 67 of the housing 53. The sensor 70 may be securely installed in a saddle or bracket 72 that may be attached to the second leg 44.

The saddle 72 may include an opening 75 (FIG. 8) that is defined in a side surface 77 thereof. The sensor 70 may be installed (e.g., via a press-fit of snap-fit) in the saddle 72 via the opening 75. It should be understood that an opening (not shown) may be defined in any other surfaces (e.g., upper surface, lower surface, or other side surfaces) of the saddle 72, and that the sensor 70 may be securely installed in the saddle 72 via the opening. In some configurations, the sensor 70 may be attached to the second leg 44 via other means (e.g., an elastic band or a fastener) instead of the saddle 72.

Figure 9:
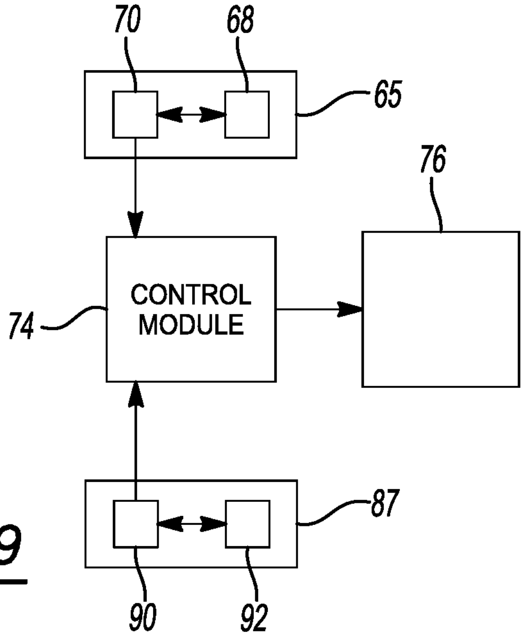
FIG. 9 is a block diagram illustrating communication between a control module, a sensor assembly and a notification system.

The magnet 68 and the sensor 70 may communicate with each other (FIG. 9) to detect when the door-locking member 20 is removed from the slot 62. For example, the magnet 68 and the sensor 70 may use magnetic fields or a beam of light or electromagnetic radiation in order to detect movement between the door-locking member 20 and the housing 53. When the door-locking member 20 is removed from the slot 62, a change to the magnetic field or return signal occurs, which causes the sensor 70 to send a signal (wired or wireless) to a control module 74 that may be in communication with a notification system 76.

In some configurations, the sensor 70 may have an altimeter or an altitude meter disposed therein to measure an altitude (or height) of the door-locking member 20 relative to the floor 22, for example. In this way, when the door-locking member 20 is removed from the slot 62, the altitude of the door-locking member 20 relative to the floor 22 changes, which causes the sensor 70 to send a signal to the control module 74 that may be in communication with the notification system 76.

In some configurations, the sensor 70 may have an accelerometer disposed therein to measure acceleration (i.e., rate of change in velocity) of the door-locking member 20. That is, when the door-locking member 20 is removed from the slot 62, the acceleration of the door-locking member 20 changes, which causes the sensor 70 to send a signal to the control module 74 that may be in communication with the notification system 76. It should be understood that the sensor 70 may include other instruments that detect removal of the door-locking member 20 from the slot 62. In some configurations, the magnet 68 may be associated with the door-locking member 20 and the sensor 70 may be associated with the housing 53.

It should be understood that the sensor assembly 65 can be a single part unit and/or a two part unit. For example, the single part unit may include a single part (i.e., a sensor) that is not dependent upon a second part (e.g., a magnet) to operate. That is, the single part detects removal of the door-locking member 20 from the slot 62, and sends a signal to the control module 74. The two part unit may include a first part (i.e., a sensor) that depends on a second part (e.g., a magnet) to operate. That is, the first part communicates with the second part to detect removal of the door-locking member 20 from the slot 62, which causes the first part to send a signal to the control module 74.

When the sensor 70 sends a signal to the control module 74, the control module 74 communicates with the notification system 76 that is configured to generate an alert indicating the removal of the door-locking member 20 from the storage container 14 in the room 24. The control module 74 may be in communication with the notification system 76 via, for example, an internet, Wi-Fi, Bluetooth®, Zigbee®, power-line carrier communication (PLCC), or cellular connection or any other wired or wireless communication protocol. For example, the control module 74 may communicate with the notification system 76 over the internet via a Wi-Fi connection to a Wi-Fi router located in or associated with the building 25. The notification system 76 could be a computer, a mobile phone (e.g., smartphone), or a tablet, for example, or any other communication device or network of devices. In this way, persons within the building 25, persons in close proximity to the building 25, persons in remote locations relative to the building 25 and/or local law enforcement agencies are notified that there is an emergency situation in the building 25.

As described above, the second member 51 may be rotatably attached to the mounting plate 52 between a closed position (FIGS. 2 and 4) and an open position (FIGS. 3, 5 and 6). When the door-locking member 20 is received in the slot 62 and the second member 51 is in the closed position, the second member 51 and the mounting plate 52 cooperate to house the door-locking member 20. When the second member 51 is in the closed position, the second member 51 and the mounting plate 52 cooperate to form a cavity 82 that the housing 53 extends into (FIG. 4). The second member 51 includes a plurality of panels 84, 86, 88. The panel 84 may be rotatably attached to the mounting plate 52. The panel 86 may extend perpendicular from the panels 84, 88 and may be gripped by a user (not shown) at a periphery thereof to rotate the second member 51 between the closed position and the open position. The panel 88 may be transparent and may extend perpendicular from the panels 84, 86. The panel 88 may form a top to the storage container 14.

A sensor assembly 89 may detect when the second member 51 is rotated from the closed position to the open position. The sensor assembly 89 may include a sensor 90 and a magnet 92. The sensor 90 may be associated with the second member 51 and the magnet 92 may be associated with the mounting plate 52. For example, the sensor 90 may be disposed on an inner surface 94 of the panel 86. In some configurations, the sensor 90 may be embedded within the panel 86. The magnet 92 may be disposed on an inner surface 96 of the mounting plate 52. In some configurations, the magnet 92 may be embedded within the mounting plate 52. The sensor 90 and the magnet 92 may communicate with each other (FIG. 9) to detect when the second member 51 is rotated to the open position. For example, the sensor 90 and the magnet 92 may use magnetic fields or a beam of light or electromagnetic radiation in order to detect movement between the mounting plate 52 and the second member 51. When the second member 51 is rotated from the closed position to the open position, a change to the magnetic field or return signal occurs, which causes the sensor 90 to send a signal to the control module 74 that may be in communication with the notification system 76. In some configurations, when the second member 51 has been rotated from the closed position to the open position and the sensor 90 sends a signal to the control module 74, the control module 74 may generate an audible alarm at various locations within or outside of the building 25.

In some configurations, the sensor 90 may have an accelerometer disposed therein to measure acceleration (i.e., rate of change in velocity) of the second member 51. That is, when the second member 51 is rotated from the closed position to the open position, the acceleration of the second member 51 changes, which causes the sensor 90 to send a signal to the control module 74 that may be in communication with the notification system 76. It should be understood that the sensor 90 may include other instruments that detect when the second member 51 has been rotated from the closed position to the open position.

When the sensor 90 sends a signal to the control module 74, the control module 74 communicates with the notification system 76 that is configured to generate an alert indicating the opening of the storage container 14 in the room 24 and that there is an emergency situation. The system 76 could include the sensor assembly 65 and the sensor assembly 87 or the system 76 could include the sensor assembly 65 or the sensor assembly 87. In some configurations, the magnet 92 may be associated with the second member 51 and the sensor 90 may be associated with the mounting plate 52.

It should be understood that the sensor assembly 87 can be a single part unit and/or a two part unit. For example, the single part unit may include a single part (i.e., a sensor) that is not dependent upon a second part (e.g., a magnet) to operate. That is, the single part detects rotation of the second member 51 from the closed position to the open position, and sends a signal to the control module 74. The two part unit may include a first part (i.e., a sensor) that depends on a second part (e.g., a magnet) to operate. That is, the first part communicates with the second part to detect rotation of the second member 51 from the closed position to the open position, which causes the first part to send a signal to the control module 74.

With continued reference to FIGS. 1-10, operation of the door security apparatus 10 will be described in detail. The second member 51 is in the closed position and the door-locking member 20 may be securely installed in the housing 53 of the storage container 14. During an emergency situation, an occupant (not shown) in the room 24 may first close the door 30 to the room 24. Next, the occupant may rotate the second member 51 to the open position, remove the door-locking member 20 from the slot 62 and attach the door-locking member 20 to the first and second plates 16, 18 as described above. In this way, the door-locking member 20 operates to oppose forces applied to the door 30 from outside the room 24, thereby preventing the door 30 from being moved from the closed position to the open position.

When the occupant rotates the second member 51 from the closed position to the open position (i.e., to gain access to the door-locking member 20), the sensor assembly 89 detects movement between the second member 51 and the mounting plate 52, which causes the sensor 90 to send a signal to the control module 74 that may be in communication with the notification system 76. When the sensor 90 sends the signal to the control module 74, the control module 74 communicates with the notification system 76 that is configured to generate an alert indicating the opening of the storage container 14 in the room 24.

When the occupant removes the door-locking member 20 from the slot 62, the sensor assembly 65 detects movement between the door-locking member 20 and the housing 53, which causes the sensor 70 to send a signal to the control module 74 that may be in communication with the notification system 76. When the sensor 70 sends the signal to the control module 74, the control module 74 communicates with the notification system 76 that is configured to generate an alert indicating the removal of the door-locking member 20 from the storage container 14 in the room 24.

Once the emergency situation has been resolved, the door-locking member 20 may be detached (i.e., removed) from the first and second plates 16, 18 and securely disposed back into the slot 62. It should be understood that the others rooms 43 in the building 25 or the hallway 41 may each include the door security apparatus 10 in addition to the room 24. The door security apparatus 10 of the present disclosure provides a storage container 14 that houses the door-locking member 20 near the door 30 for easy access during an emergency situation. The door security apparatus 10 of the present disclosure also provides the benefit quickly notifying persons within the building 25, persons in close proximity to the building 25, persons in remote locations relative to the building 25 and/or local law enforcement agencies that there is an emergency situation in the building 25.

Figure 10:
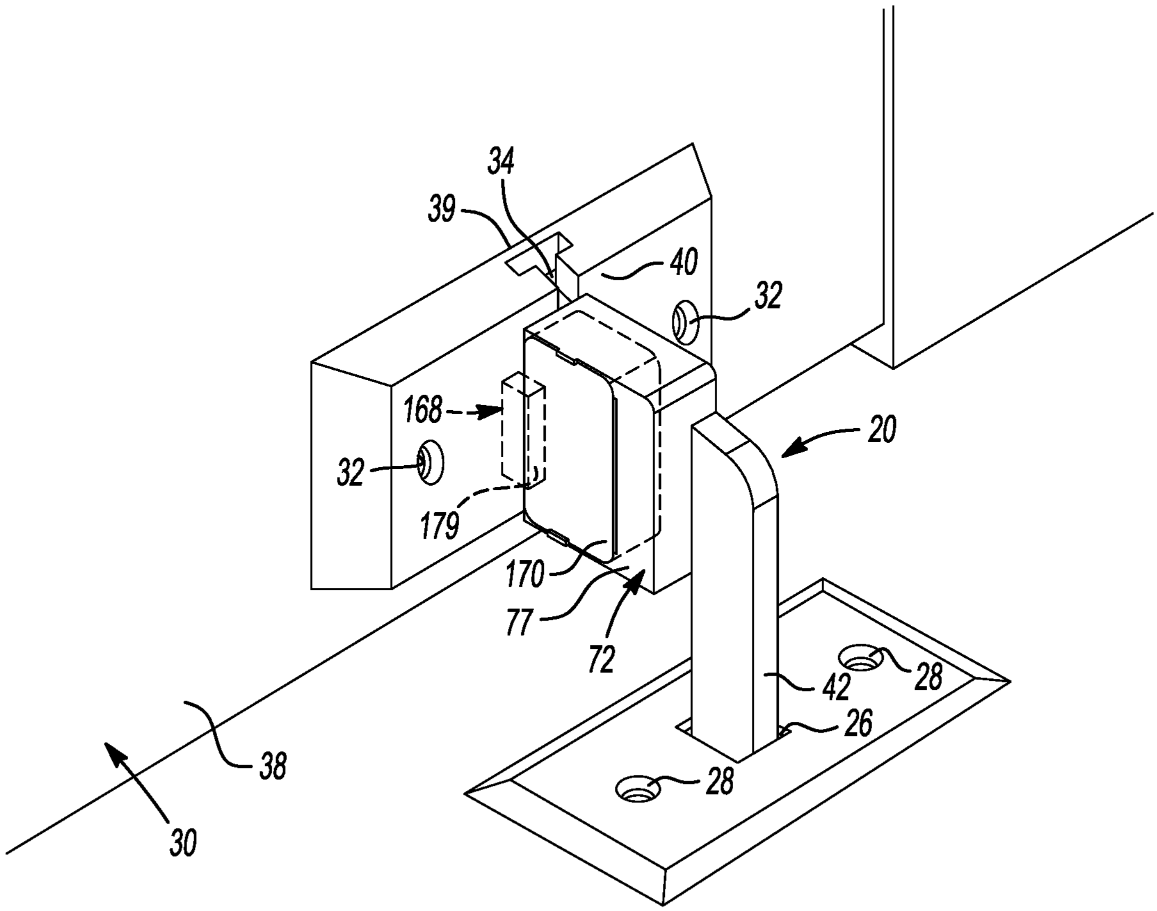
FIG. 10 is a perspective view of the door-locking member attached to the first and second plates of the door security apparatus according to the principles of the present disclosure.
Figure 11:
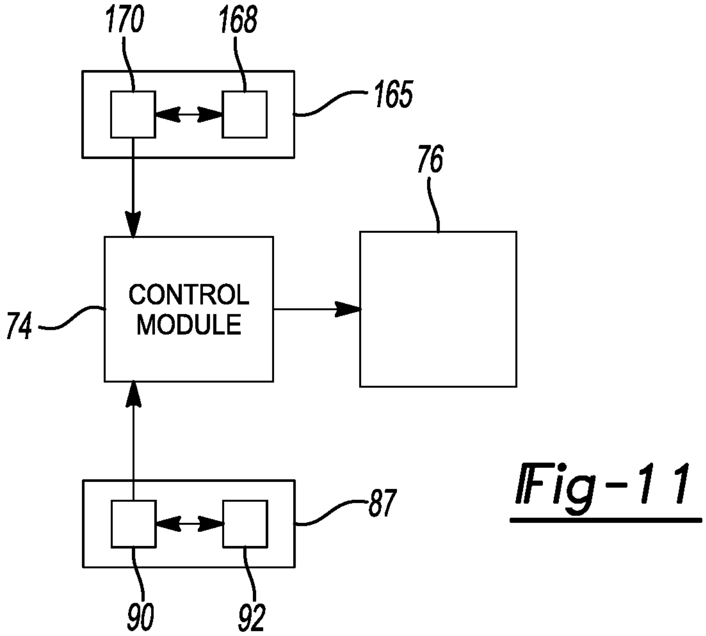
FIG. 11 is a block diagram illustrating communication between the control module, another sensor assembly and the notification system.

While the storage container 14 is described above as being used with the door security device 12 (i.e., having first plate 16 and second plate 18), it will be appreciated that the storage container 14 could be used with other security devices. Examples of other security devices include those disclosed in commonly owned U.S. Pat. Nos. 9,534,430, 8,894,110, and 8,888,146, the disclosures of which are incorporated herein by reference. With reference to FIGS. 10 and 11, another sensor assembly 165 is provided. The sensor assembly 165 may be incorporated into the door security device 10 instead of the sensor assembly 65. The structure and function of the sensor assembly 165 may be similar to identical to that of the sensor assembly 65 described above, apart from any exception noted below.

The sensor assembly 165 may detect when the door-locking member 20 is attached to the first and second plates 16, 18 (FIG. 10). The sensor assembly 165 may include a magnet 168 and a sensor 170. The magnet 168 may be associated with the second plate 18 and the sensor 170 may be associated with the door-locking member 20. For example, the magnet 168 may be embedded within the second plate 18 so that a surface 179 of the magnet 168 is co-planar with the outer surface 40 of the second plate 18. In some configurations, the magnet 168 may be associated with the first plate 16. The sensor 170 may be securely installed in the saddle or bracket 72 that may be attached to the second leg 44.

The sensor 170 may be similar or identical to the sensor 70 described above, and therefore, will not be described again in detail. The sensor 170 may be installed (e.g., via a press-fit of snap-fit) in the saddle 72 via the opening 75. The magnet 168 and the sensor 170 may communicate with each other (FIG. 11) to detect when the door-locking member 20 is attached to the first and second plates 16, 18. For example, the magnet 168 and the sensor 170 may use magnetic fields or a beam of light or electromagnetic radiation in order to detect when the door-locking member 20 is attached to the first and second plates 16, 18. When the door-locking member 20 is attached to the first and second plates 16, 18, a change to the magnetic field or return signal occurs, which causes the sensor 170 to send a signal (wired or wireless) to the control module 74 that may be in communication with the notification system 76.

It should be understood that the sensor assembly 165 can be a single part unit and/or a two part unit. For example, the single part unit may include a single part (i.e., a sensor) that is not dependent upon a second part (e.g., a magnet) to operate. That is, the single part detects attachment of the door-locking member 20 to the first and second plates 16, 18, and sends a signal to the control module 74. The two-part unit may include a first part (i.e., a sensor) that depends on a second part (e.g., a magnet) to operate. That is, the first part communicates with the second part to detect attachment of the door-locking member 20 to the first and second plates 16, 18, which causes the first part to send a signal to the control module 74.

When the sensor 170 sends a signal to the control module 74, the control module 74 communicates with the notification system 76 that is configured to generate an alert indicating the attachment of the door-locking member 20 to the first and second plates 16, 18 in the room 24.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term 'module' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "for."

What is claimed is:

1. A door security apparatus comprising:

a storage container;

a door-locking member removably disposed within the storage container, wherein the door-locking member is a barricade that is configured to restrict movement of a door when the door-locking member is in a locked position following removal of the door-locking member from the storage container; and a sensor assembly configured to detect whether the door-locking member is in the locked position, wherein the storage container is an unsecured container.

2. The door security apparatus of claim 1, wherein the sensor assembly includes a sensor and a magnet, and wherein the sensor detects the magnet when the door-locking member is in the locked position.

3. The door security apparatus of claim 2, wherein one of the sensor and the magnet is attached to the door-locking member and the other of the sensor and the magnet is attached to a plate that engages the door-locking member when the door-locking member is in the locked position.

4. The door security apparatus of claim 1, further comprising a control module that is in communication with the sensor assembly, and wherein the sensor assembly is configured to send a signal to the control module upon detecting that the door-locking member is in the locked position.

5. The door security apparatus of claim 4, further comprising a notification system that is in communication with the control module, wherein the notification system is configured to generate an alert when the sensor assembly sends the signal to the control module.

6. The door security apparatus of claim 1, wherein the sensor assembly is configured to detect when the door-locking member is removed from the storage container.

7. The door security apparatus of claim 6, wherein the sensor assembly is configured to send a signal to a control module in response to the door-locking member being removed from the storage container.

8. The door security apparatus of claim 1, wherein the sensor assembly is configured to detect whether the storage container is in a closed position.

9. The door security apparatus of claim 8, wherein the sensor assembly is configured to send a signal to a control module in response to the storage container being moved from the closed position toward an open position.

10. A door security apparatus comprising:

a storage container;

a door-locking member configured to removably engage the storage container, wherein the door-locking member is configured to removably engage a plate after removal of the door-locking member from the storage container, and wherein the door-locking member is a barricade that restricts movement of a door from a closed position to an open position while the door-locking member is engaged with the plate; and a sensor assembly configured to detect engagement between the door-locking member and the plate and generate a signal in response to engagement between the door-locking member and the plate.

11. The door security apparatus of claim 10, wherein the sensor assembly includes a sensor and a magnet, and wherein the sensor detects the magnet when the door-locking member is engaged with the plate.

12. The door security apparatus of claim 11, wherein one of the sensor and the magnet is attached to the door-locking member and the other of the sensor and the magnet is attached to a plate that engages the door-locking member when the door-locking member is engaged with the plate.

13. The door security apparatus of claim 10, further comprising a control module that is in communication with the sensor assembly, and wherein the sensor assembly is configured to send a signal to the control module upon detecting that the door-locking member is engaged with the plate.

14. The door security apparatus of claim 13, further comprising a notification system that is in communication with the control module, wherein the notification system is configured to generate an alert when the sensor assembly sends the signal to the control module.

15. The door security apparatus of claim 13, wherein the sensor assembly is configured to detect when the door-locking member is removed from the storage container.

16. The door security apparatus of claim 15, wherein the sensor assembly is configured to send a signal to the control module indicating that the door-locking member has been removed from the storage container.

17. The door security apparatus of claim 16, wherein the sensor assembly is configured to detect whether the storage container is in a closed position.

18. The door security apparatus of claim 17, wherein the sensor assembly is configured to send a signal to the control module indicating that the storage container has been moved from the closed position toward an open position.

19. A door security apparatus comprising:

a storage container having a first member and a second member, wherein the second member is movable relative to the first member between a closed position and an open position;

a door-locking member removably disposed within the storage container, wherein the door-locking member is a barricade that is configured to restrict movement of a door when the door-locking member is in a locked position following removal of the door-locking member from the storage container; and a sensor assembly configured to detect movement of the second member from the closed position toward the open position.

20. The door security apparatus of claim 19, wherein the sensor assembly includes a sensor and a magnet, and wherein the sensor detects the magnet when the second member is in the closed position.

21. The door security apparatus of claim 20, wherein one of the sensor and the magnet is attached to the first member and the other of the sensor and the magnet is attached to the second member.

22. The door security apparatus of claim 19, further comprising a control module that is in communication with the sensor assembly, and wherein the sensor assembly is configured to send a signal to the control module upon detecting that the second member has moved from the closed position toward the open position.

23. The door security apparatus of claim 22, further comprising a notification system that is in communication with the control module, wherein the notification system is configured to generate an alert when the sensor assembly sends the signal to the control module.

24. The door security apparatus of claim 23, wherein the sensor assembly is configured to detect when the door-locking member is removed from the storage container.

25. The door security apparatus of claim 24, wherein the sensor assembly is configured to send a signal to the control module indicating that the door-locking member has been removed from the storage container.

26. The door security apparatus of claim 23, wherein the sensor assembly is configured to detect whether the door-locking member is in the locked position.

27. The door security apparatus of claim 26, wherein the sensor assembly is configured to send a signal to the control module indicating that the door-locking member is in the locked position.

* * * * *